ABSTRACT TEXT

United States Patent
Leggett et al.

(10) Patent No.: US 9,784,874 B2
(45) Date of Patent: Oct. 10, 2017

(54) MULTI-BEAM PHASED ARRAY ACOUSTIC TRANSDUCER OPERATION FOR DOWNHOLE APPLICATIONS

(71) Applicant: Baker Hughes Incorporated, Houston, TX (US)

(72) Inventors: James V. Leggett, Magnolia, TX (US); Kamalesh Chatterjee, Spring, TX (US); Roger R. Steinsiek, Houston, TX (US); Vaibhav Sule, Houston, TX (US); Jinsong Zhao, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 377 days.

(21) Appl. No.: 14/567,912

(22) Filed: Dec. 11, 2014

(65) Prior Publication Data

US 2016/0170063 A1    Jun. 16, 2016

(51) Int. Cl.
*G01V 1/44* (2006.01)
*G10K 11/34* (2006.01)
(Continued)

(52) U.S. Cl.
CPC ............. *G01V 1/44* (2013.01); *G01S 7/52003* (2013.01); *G01S 7/524* (2013.01); *G01S 7/526* (2013.01);
(Continued)

(58) Field of Classification Search
CPC  G01V 1/44; G01S 15/89; G01S 15/88; G01S 7/524; G01S 7/526; G01S 7/52003; G10K 11/34; G10K 11/346
(Continued)

(56) References Cited

U.S. PATENT DOCUMENTS 4,867,264 A    9/1989    Siegfried
7,537,567 B2   5/2009    Jago et al.
(Continued)

FOREIGN PATENT DOCUMENTS

FR    EP 1348954 A1 *  10/2003  ......... G01N 29/2456

OTHER PUBLICATIONS

Glascock, David; "Phased Arrays Improve Pipe Inspection";The American Oil & Gas Reporter; Sep. 2005; 3 pages.
(Continued)

*Primary Examiner* — Daniel L Murphy
(74) *Attorney, Agent, or Firm* — Cantor Colburn LLP

(57) ABSTRACT

An apparatus for imaging a borehole wall includes an array of acoustic transducers and a controller. The controller scans a section of the borehole wall with first acoustic beams that are transmitted by a series of sets of acoustic transducers in the array to produce adjacent first acoustic measurements that are spaced a first distance D1 apart along the borehole wall, each set having at least one transducer that is different from an adjacent set, (ii) steers a second acoustic beam along the section of the borehole wall using one set of acoustic transducers in the array to produce adjacent second acoustic measurements that are a second distance D2 apart along the borehole wall, and (iii) images the borehole wall using the first acoustic measurements and the second acoustic measurement to generate a borehole wall image, wherein at least one second acoustic measurement is between adjacent first acoustic measurements.

21 Claims, 15 Drawing Sheets

(51) Int. Cl.
    *G01S 15/89*    (2006.01)
    *G01S 7/52*     (2006.01)
    *G01S 7/524*    (2006.01)
    *G01S 7/526*    (2006.01)
    *G01S 15/88*    (2006.01)

(52) U.S. Cl.
    CPC .............. *G01S 15/88* (2013.01); *G01S 15/89* (2013.01); *G10K 11/34* (2013.01); *G10K 11/346* (2013.01)

(58) Field of Classification Search
    USPC ....................................................... 367/7, 35
    See application file for complete search history.

(56) References Cited

U.S. PATENT DOCUMENTS

| 2012/0120767 | A1  | 5/2012  | Vu et al. |
|---|---|---|---|
| 2012/0186335 | A1* | 7/2012  | Pace .................. E21B 47/0002 73/152.47 |
| 2013/0286778 | A1* | 10/2013 | Kisner .................. G01N 29/00 367/35 |
| 2014/0177388 | A1  | 6/2014  | D'Angelo |

OTHER PUBLICATIONS

International Search Report and the Written Opinion of the International Searching Authority, or the Declaration; PCT/US15/063227; Mailing Date Feb. 5, 2016; 13 pages.

\* cited by examiner

MULTI-BEAM PHASED ARRAY ACOUSTIC TRANSDUCER OPERATION FOR DOWNHOLE APPLICATIONS

BACKGROUND

Earth formations may be used for various purposes such as hydrocarbon production, geothermal production, and carbon dioxide sequestration. In order to efficiently use an earth formation, the formation is characterized by performing measurements of many different properties using one or more tools conveyed through a borehole penetrating the formation. One category of tools is acoustic tools that use sound waves to perform various measurements such as imaging a wall of the borehole to determine borehole rugosity as one example. Under certain circumstances, conveying a tool through the borehole for logging purposes may require that other borehole activities be suspended while the logging is taking place. This, unfortunately, can lead to increased production or exploration costs. Hence, it would be well received in the drilling industry if acoustic downhole tools were developed that reduce the amount of time required to perform downhole acoustic measurements.

BRIEF SUMMARY

Disclosed is an apparatus for imaging a wall of a borehole penetrating the earth. The apparatus includes: a carrier configured to be conveyed through the borehole; an array of acoustic transducers disposed on the carrier and configured to at least one of transmit an acoustic signal toward the borehole wall and receive an acoustic return signal from the borehole wall; a controller configured to (i) scan a section of the borehole wall with first acoustic beams that are transmitted by a series of sets of acoustic transducers in the array to produce adjacent first acoustic measurements that are spaced a first distance D1 apart along the borehole wall, each set having at least one transducer that is different from an adjacent set, (ii) steer a second acoustic beam along the section of the borehole wall using one set of acoustic transducers in the array to produce adjacent second acoustic measurements that are a second distance D2 apart along the borehole wall, and (iii) image the borehole wall using the first acoustic measurements and the second acoustic measurement to generate a borehole wall image, wherein at least one second acoustic measurement is between adjacent first acoustic measurements; and an output interface coupled to the processor and configured to transmit a signal comprising the borehole wall image to a signal receiving device.

Also disclosed is a method for imaging a wall of a borehole penetrating the earth. The method includes: conveying a carrier through the borehole, the carrier having disposed thereon an array of acoustic transducers, the array of acoustic transducers being configured to at least one of transmit an acoustic signal toward the borehole wall and receive an acoustic return signal from the borehole wall; scanning a section of the borehole wall with first acoustic beams that are transmitted by a series of sets of acoustic transducers in the array to produce adjacent first acoustic measurements that are spaced a first distance D1 apart along the borehole wall, each set having at least one transducer that is different from an adjacent set; steering a second acoustic beam along the section of the borehole wall using one set of acoustic transducers in the array to produce adjacent second acoustic measurements that are a second distance D2 apart from each other along the borehole wall, wherein at least one second acoustic measurement is between adjacent first acoustic measurements; imaging the borehole wall using the first acoustic measurements and the second acoustic measurements to produce a borehole wall image using a processor; and transmitting a signal having the borehole wall image to a signal receiving device using an output interface coupled to the processor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are apparatus and method for imaging a wall of a borehole penetrating the earth using acoustic energy or sound waves. Acoustic measurements are performed at points along a perimeter of the borehole at a certain depth. The measurements are performed using an array of acoustic transducers that can transmit acoustic energy toward the borehole wall and/or receive return acoustic energy from the borehole wall. An acoustic beam is generated by a set of acoustic transducers in the array that can image a point or area on the borehole wall. By shifting the transducers in the set used to generate the acoustic beam, the point being imaged can also be shifted along the perimeter in order to scan the perimeter. In addition, another acoustic beam can be generated by one set of acoustic transducers and this beam can be moved or steered along the perimeter by applying a time delay related to each of the acoustic transducers for coordinating emission and/or reception of acoustic energy in the set. The steered acoustic beams may be used to image points of the borehole wall between scanned image points. In this manner, a precise high resolution image of the borehole wall may be obtained.

Figure 1:
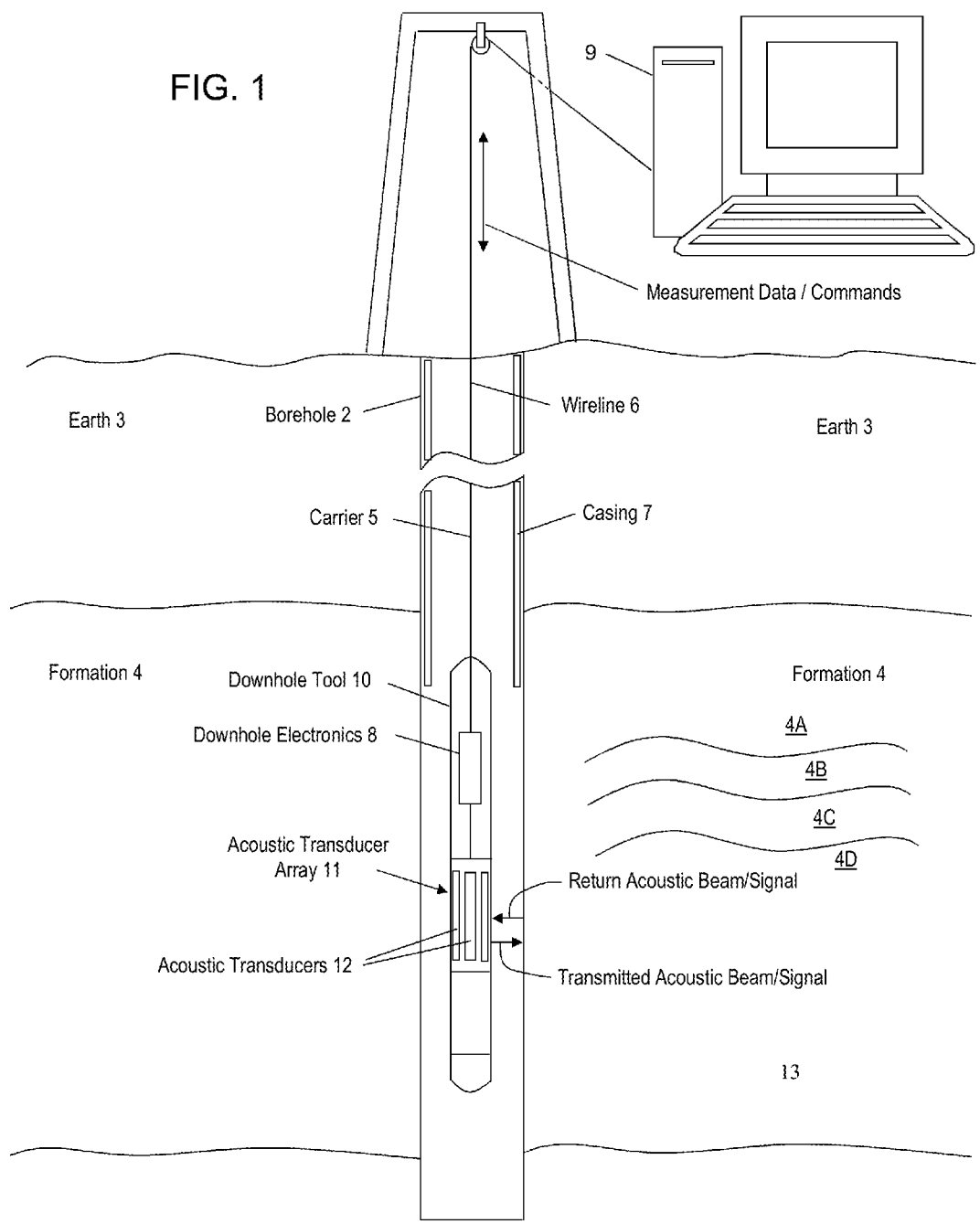
FIG. 1 illustrates a cross-sectional view of an exemplary embodiment of an acoustic downhole tool disposed in a borehole penetrating the earth.

Apparatus for implementing the disclosed method is now discussed with reference to FIG. 1. In FIG. 1, a side view is illustrated of an exemplary embodiment of a downhole acoustic tool 10 disposed in a borehole 2 penetrating the earth 3, which includes a formation 4 having formation layers 4A-4D. (For illustration purposes, the formation layers are only illustrated on the right side of the borehole, but are also intended to be illustrative of surrounding the borehole.) Each of the formation layers may have different measureable characteristics such as a lithology different from a lithology of adjacent layers. The borehole 2 or portions of the borehole 2 may be lined with a casing 7. The acoustic tool 10 is conveyed through the borehole 2 by a carrier 5. In the embodiment of FIG. 1, the carrier 5 is an armored wireline 6. Besides supporting and conveying the acoustic tool 10 in the borehole 2, the wireline 6 can provide communications (i.e., telemetry) between the downhole tool 10 and a computer processing system 9 disposed at the surface of the earth 3. Communications can include sending measurements uphole to the computer processing system 9 or commands downhole to the downhole tool 10. In addition, the wireline 6 can supply electrical power to the acoustic tool 10. In order to operate the acoustic tool 10, process measurement data, and/or provide a communications interface with the surface computer processing system 9, the downhole tool 10 includes downhole electronics 8. The operating, control, processing, and display functions of the disclosure may be performed by the downhole electronics 8, the computer processing system 9, or a combination thereof. Hence, the downhole electronics 8 and/or the computer processing system 9 may be referred to as a controller. In an alternative embodiment referred to as logging-while-drilling (LWD) or measurement-while-drilling (MWD), the carrier 5 can be a drill string or drill tubular. Telemetry for LWD or MWD may include pulsed-mud or wired drill pipe. In wireline, LWD, or MWD embodiments, measurement data may be downloaded in real time or after the downhole NMR tool 10 is retrieved from the borehole 2.

The acoustic tool 10 includes an array 11 of acoustic transducers 12. Each of the acoustic transducers 12 is configured to (i) convert an electrical signal into a corresponding acoustic signal (i.e., sound wave) that is transmitted toward a wall of the borehole 2 or (ii) receive an acoustic return signal from the borehole wall due to the transmitted acoustic signal being reflected and convert the received return acoustic signal into a corresponding electrical signal. It can be appreciated that some or all of the acoustic transducers may be configured to both transmit and receive acoustic signals, that is, to function as transceiver transducers. Any or all of the acoustic transducers may be driven by piezoelectric operation, electromagnetic operation, or magnetostrictive operation as non-limiting embodiments.

Still referring to FIG. 1, downhole electronics 8 are coupled to the acoustic transducers 12 and configured to operate these transducers and/or process transducer measurement data obtained downhole. Downhole transducer operation and data processing operations may be performed by the downhole electronics 8, the computer processing system 9, or a combination thereof. The array 11 may be operated continuously as the acoustic tool 10 is conveyed through the borehole 2 or at discrete selected depths in the borehole 2.

The array 11 of acoustic transducers 12 is operated to perform acoustic measurements that are then used to form an image of a wall of the borehole 2. The acoustic measurements may include time-of-flight (TOF) measurements in which the time it takes for a transmitted acoustic signal to traverse the annulus, reflect off of the borehole wall and return to be received is measured. TOF measurements may be used to measure a distance from the array 11 to the borehole wall and, thus, may be used to determine the rugosity of the borehole 2. If the borehole is cased, then the TOF measurements may be used to determine the casing caliper. Another type of acoustic measurement may include measuring a change in amplitude of the acoustic signal from when the acoustic signal is transmitted to when it is received. In one or more embodiments, this measurement may be represented as a ratio of amplitude of the received acoustic return signal to the amplitude of the transmitted acoustic signal ($Amplitude_{Received}/Amplitude_{Transmitted}$). Amplitude measurements may be used to determine the hardness of the borehole wall where the wall is imaged. A harder borehole wall surface will reflect more energy than a softer borehole wall surface and, thus, the return acoustic signal reflecting from the harder surface will have a higher amplitude than the return acoustic signal reflecting off the softer surface. The hardness measurements may be correlated to a lithology of a formation layer being imaged. In addition, a location (i.e., depth) of a boundary of formation layers can be determined from the amplitude measurements. In one or more embodiments, the boundary location is identified where the amplitude of the return acoustic signal changes abruptly.

Figure 2:
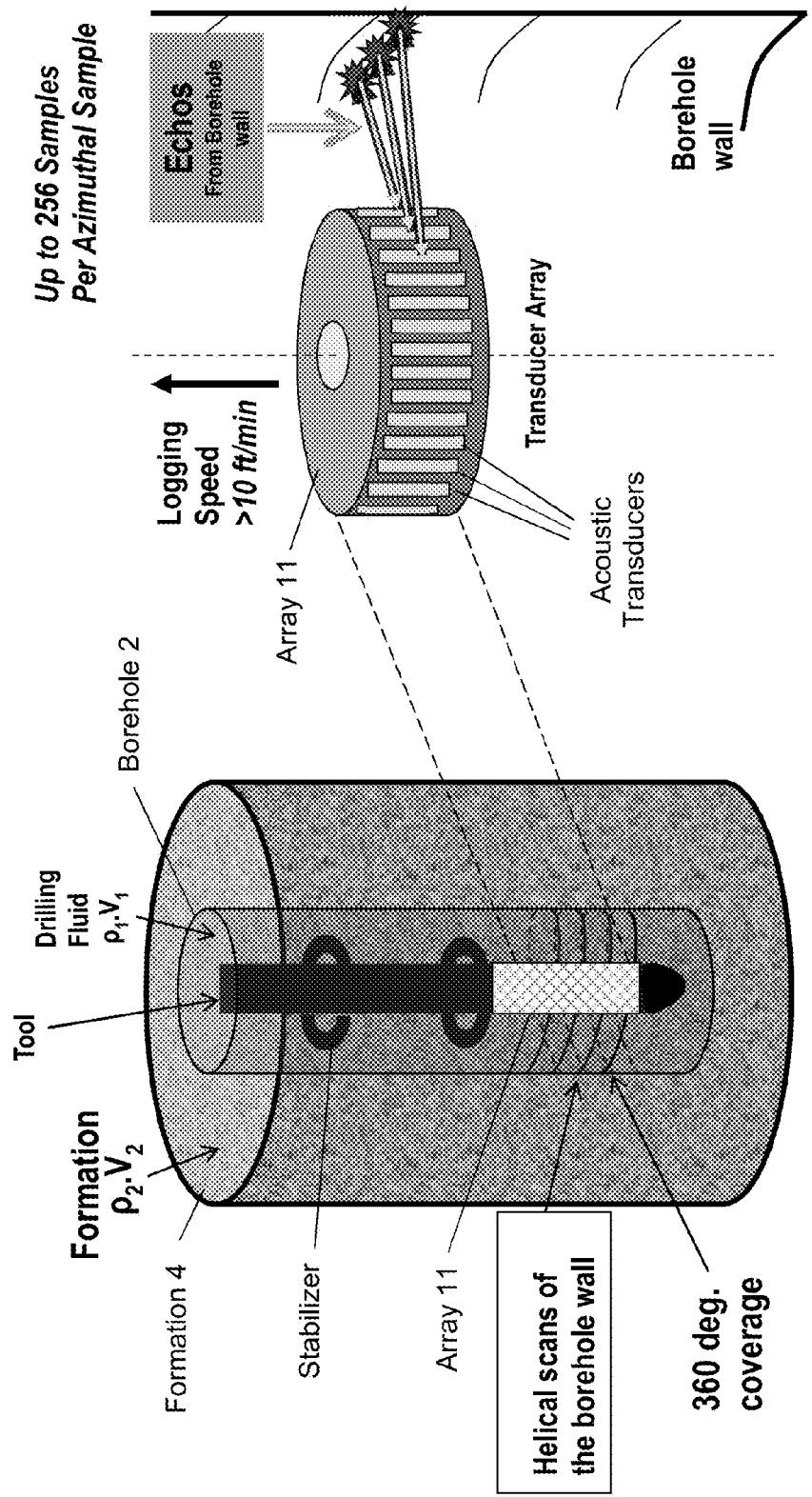
FIG. 2 depicts aspects of the acoustic downhole tool having an array of acoustic transducers.

Referring now to FIG. 2, a three-dimensional side view depicting further aspects of the array 11 disposed in the borehole 2 is illustrated. In the embodiment of FIG. 2, the array 11 is a circular linear array (i.e., the transducers are disposed along a circular line, generally along a circumference of the tool). The drilling fluid filling the borehole 2 in FIG. 2 has a density of $\rho_1$ and an acoustic velocity of $V_1$ to give an acoustic impedance of $\rho_1 V_1$ while the formation has a density of $\rho_2$ and an acoustic velocity of $V_2$ to give an acoustic impedance of $\rho_2 V_2$.

Figure 3:
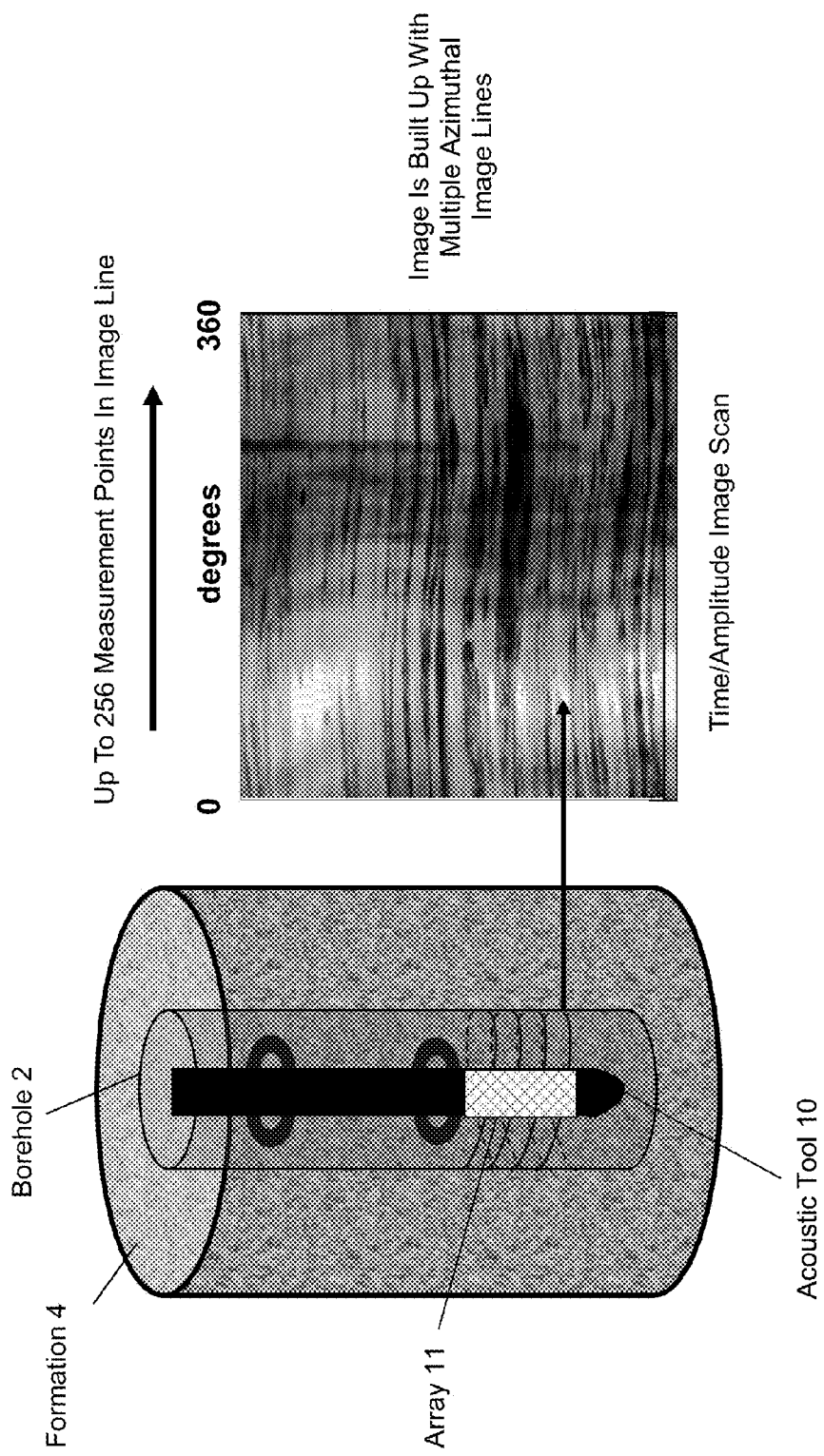
FIG. 3 depicts aspects of forming an image of a wall of the borehole using the acoustic downhole tool.

FIG. 3 depicts aspects of the acoustic tool 10 producing an image of a borehole wall. In this embodiment, 256 samples or measurement points along the borehole wall are taken to image one 360 degree line of the borehole wall at one depth or one small depth interval due to the spiral nature of the image line if the line is imaged as the tool 10 is moving in the borehole. Multiple image lines at multiple depths are combined to produce a borehole wall image for a certain depth interval.

Figure 4A:
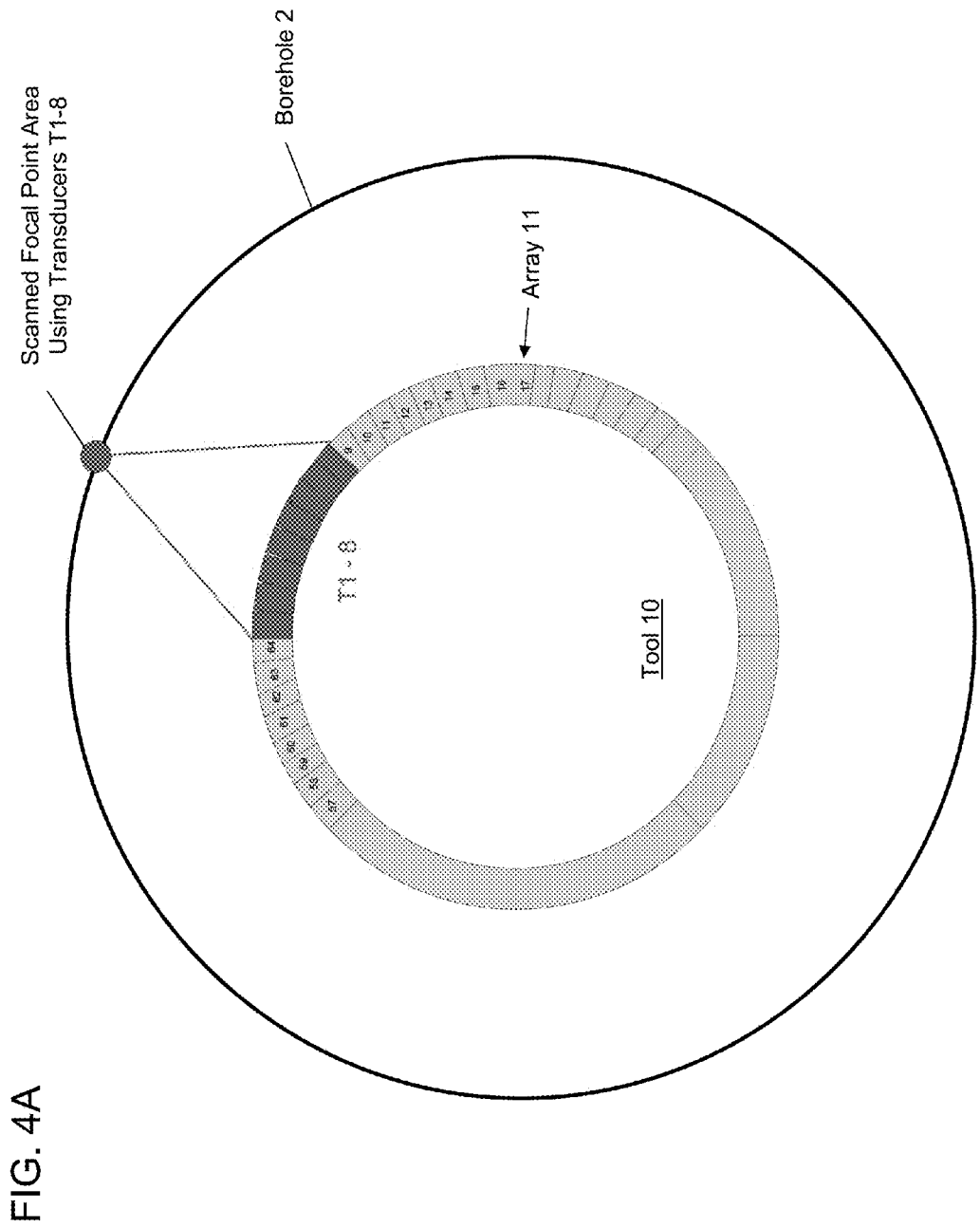
FIGS. 4A-4C, collectively referred to as FIG. 4, depict aspects of acoustic beam scanning the wall of the borehole using different sets of transducers in the array.
Figure 4B:
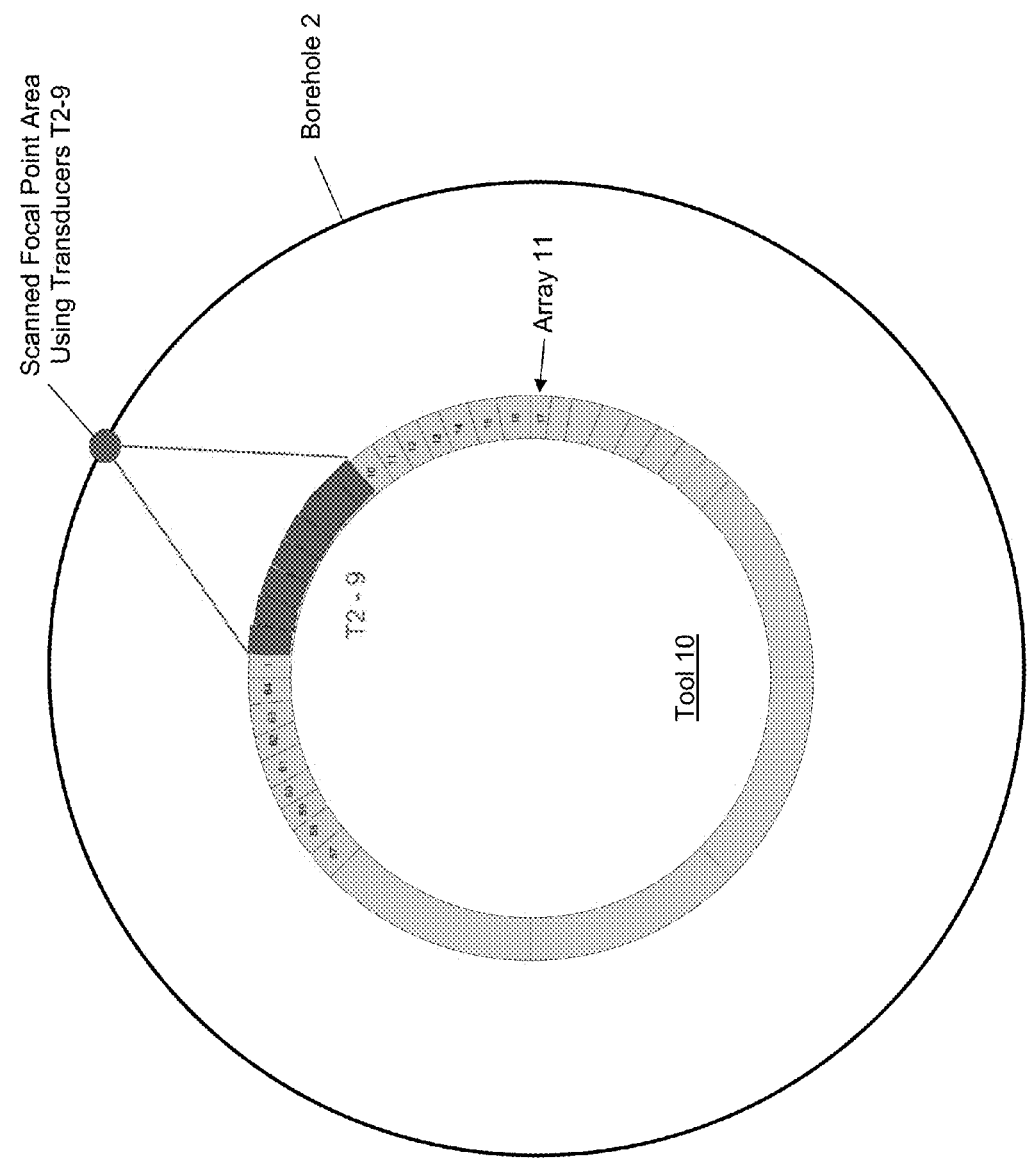
Figure 4C:
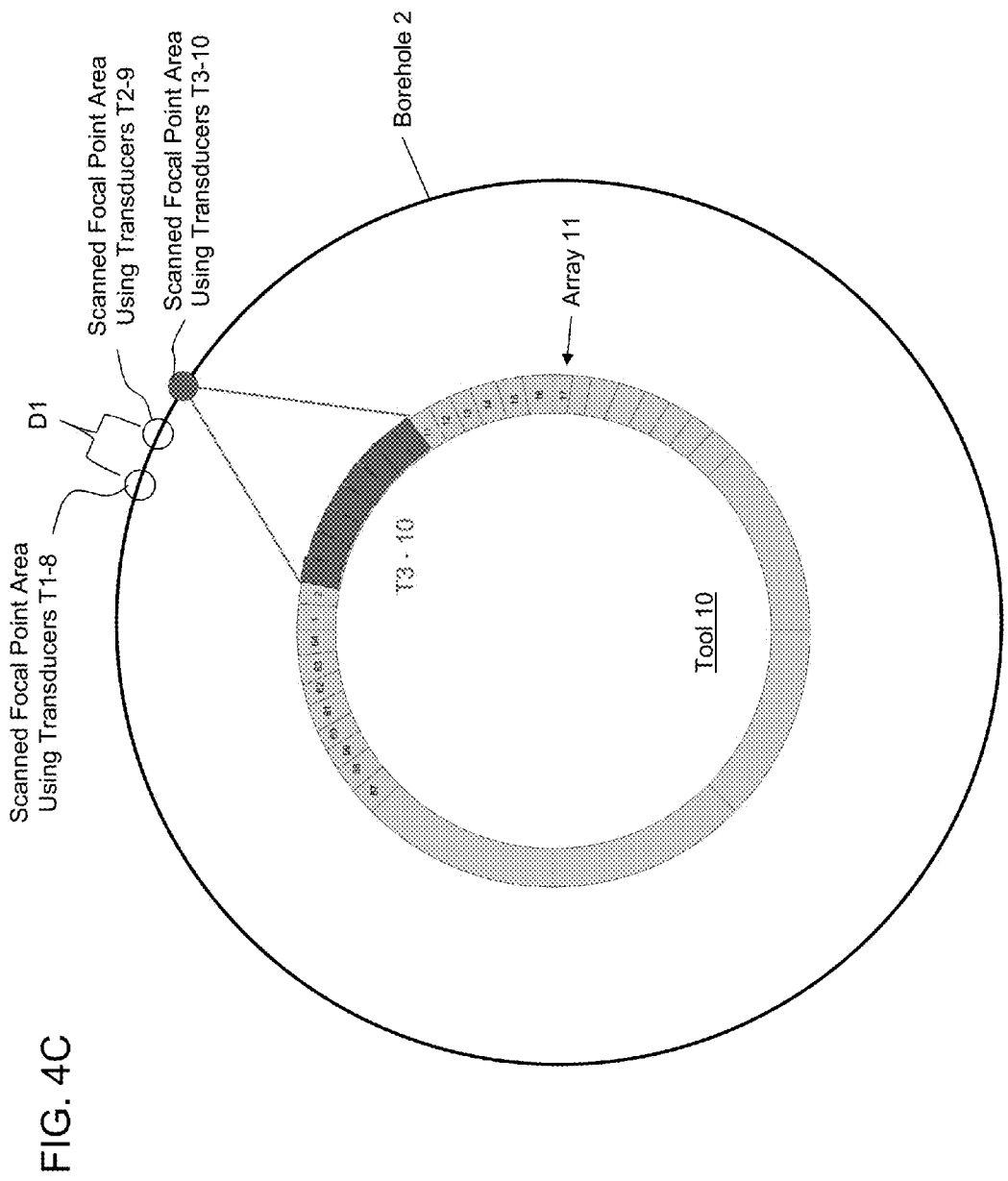

FIG. 4 depicts aspects of scanning the wall of the borehole with an acoustic beam. The term "scanning" relates to moving an imaging point or focal point of the acoustic beam on the borehole wall using different sets of transducers. The terms "imaging point" or "focal point" relate to an area on the borehole wall on which the acoustic beam impinges to perform an acoustic measurement. The acoustic beam is formed from the acoustic energy emitted from multiple transducers using various time delays. The same various time delays may then be used to receive the acoustic beam reflected off the borehole wall using the same transducers in order to construct the return acoustic signal. The acoustic beam is moved along the borehole wall by using different sets of transducers. In one or more embodiments, the sets are shifted in one direction by adding one transducer and deleting another as illustrated in FIGS. 4A-4C. In general, the transducers in a set are shifted such that at least one transducer in a set is different from a transducer in an adjacent set. The distance between adjacent scanned focal points is D1.

Figure 5:
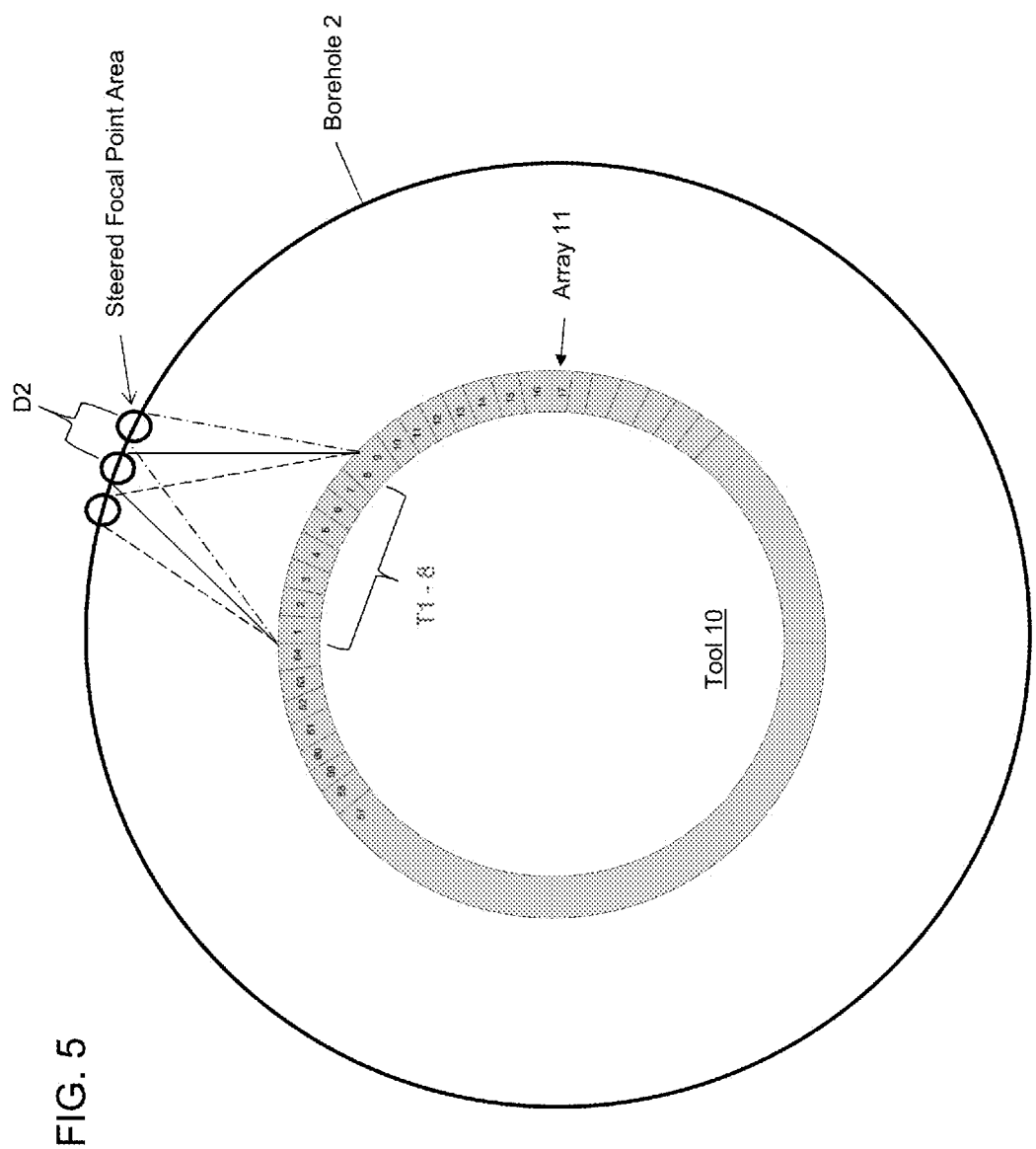
FIG. 5 depicts aspects of acoustic beam steering using one set of transducers in the array.

FIG. 5 depicts aspects of the acoustic tool 10 steering an acoustic beam along the borehole wall. The term "steering" relates to moving the focal point of the acoustic beam using only one set of acoustic transducers (e.g., transducers T1-8) as illustrated in FIG. 5. The acoustic beam is formed from the acoustic energy emitted from multiple transducers using various time delays. By changing the various time delays, the focal point can be moved to perform an acoustic measurement. The same various corresponding time delays may then be used to construct the return acoustic beam reflected off the borehole wall using the same transducers. The distance between adjacent steered focal due to acoustic steering is D2.

Figure 6:
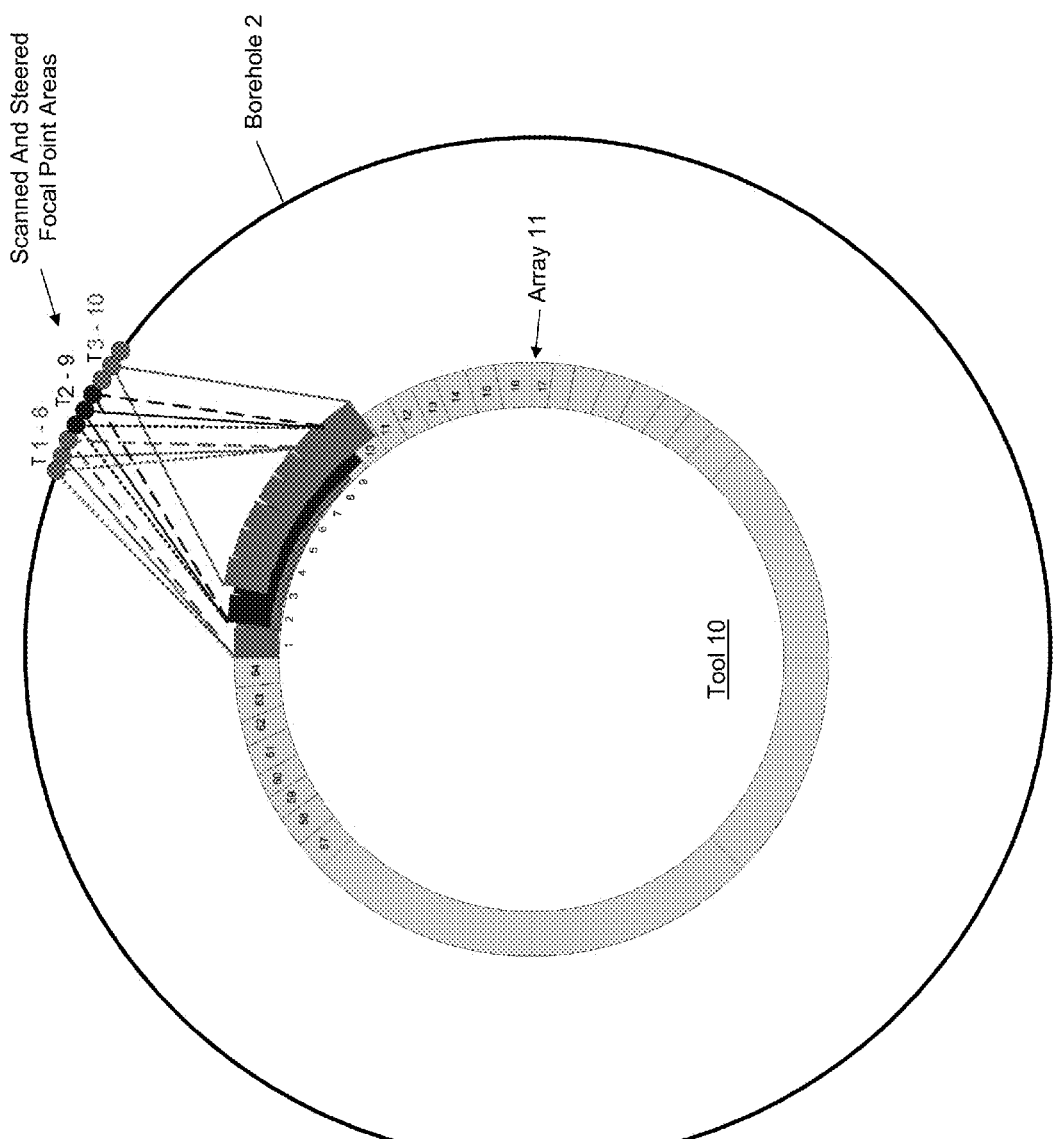
FIG. 6 depicts aspects of both acoustic beam scanning and acoustic beam steering to image the wall of the borehole.

Both acoustic beam scanning and acoustic beam steering can be used together to increase the resolution of the acoustic measurements as illustrated in FIG. 6. In the embodiment of FIG. 6, an acoustic beam is moved a distance D1 for each acoustic measurement by scanning. This may be described as a plurality of acoustic beams with each beam performing an acoustic measurement. The distance D1 may depend on the size of each transducer, the number of transducers, and the spacing between transducers. The resolution of the measurements may then be increased by performing acoustic measurements by acoustic beam steering between the measurements performed by acoustic beam scanning. The distance between the acoustic measurements performed by acoustic beam steering is D2. In one or more embodiments, a focal point area of the steered acoustic beam measurements may overlap (e.g., by 50%) the area of the scanned acoustic beam measurement. In one or more embodiments, the distance D2 is less than the distance D1 so that one or more steered acoustic measurements may be performed between the scanned acoustic measurements and may include overlapping.

Figure 7:
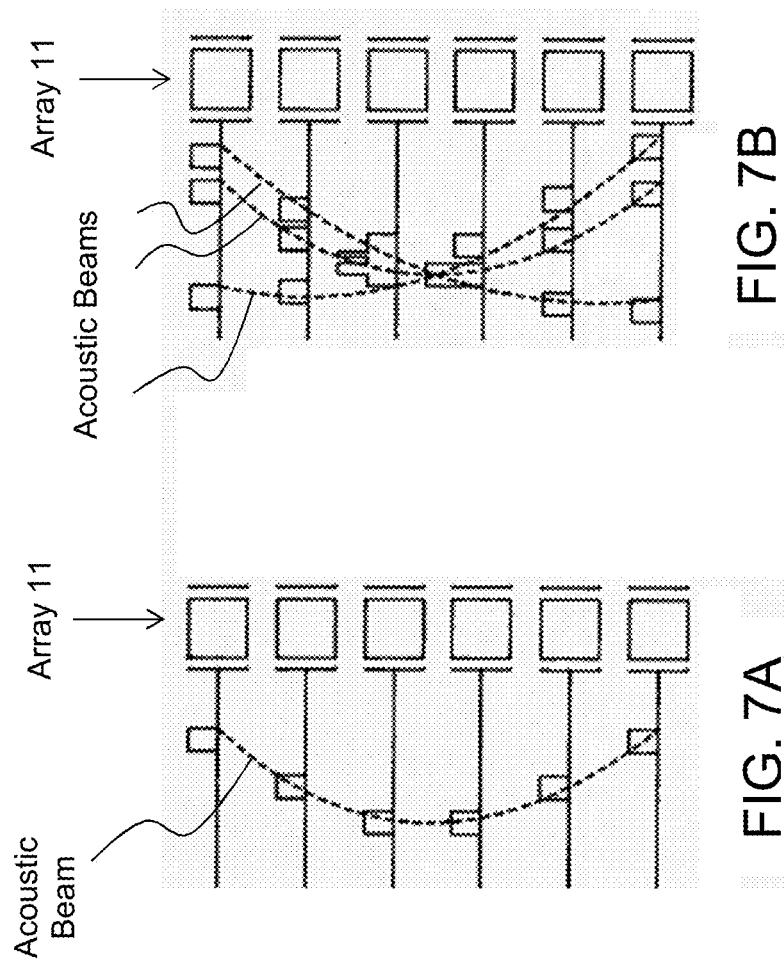
FIGS. 7A and 7B, collectively referred to as FIG. 7, depict aspects of acoustic beamforming using one set of transducers in the array.

FIG. 7 depicts aspects of acoustic beamforming using one set of transducers in the array 11. FIG. 7A illustrates aspects of forming one acoustic beam using six acoustic transducers. The dotted line represents the time delay function for transmitting acoustic energy from each transducer. FIG. 7B illustrates aspects of forming three simultaneous acoustic beams from the same six acoustic transducers. Here, the dotted lines represent the time delay function for each acoustic beam. The excitation signal to trigger the transmission of acoustic energy for each transducer is the sum of the three excitation signals of the three individual acoustic beams. It can be appreciated that the three simultaneous acoustic beams depicted in FIG. 7B may have propagation directions that are parallel (or close to parallel) to each other and may thus be referred to as parallel beams.

One advantage to using parallel or simultaneous beams is that they may be used to correct for side-lobes of the main or center beam. Side lobe beams are generated from the edges of the transducer element and project in a different direction from the main beam. The echoes of the side-lobes are much weaker than those of the main beam but if a very strong reflector is encountered they may be strong enough on returning to the transducer to be displayed prominently on the image. Because any returning echoes may be assumed by the machine to have been generated from the main beam, their position on the display can be incorrect (although at the right depth as time taken to and from transducer is the same).

Multiple side-lobe echoes as from a rapidly oscillating beam are displayed as a curved line equidistant from the transducer along its length. Correction for side-lobe beams can be implemented by transmitting only the main center beam, but receiving simultaneously three or more separate beams (i.e., main beam plus at least two side-lobe beams) using a phased array of acoustic transducers. One beam is reflected back from the direction of the main beam. The other beams due to the side-lobes, which might be symmetric with respect to each other about the main beam, are reflected back along a direction having an angle with respect to the main beam. The angle of a side-lobe may be determined by testing or calibration of the tool. The correction is thus implemented by subtracting the energy or signals of the reflected side-lobe beams from that of the main beam. The simultaneous synthesis of several receive beams requires an independent delay and sum structure for each beam.

Figure 8:
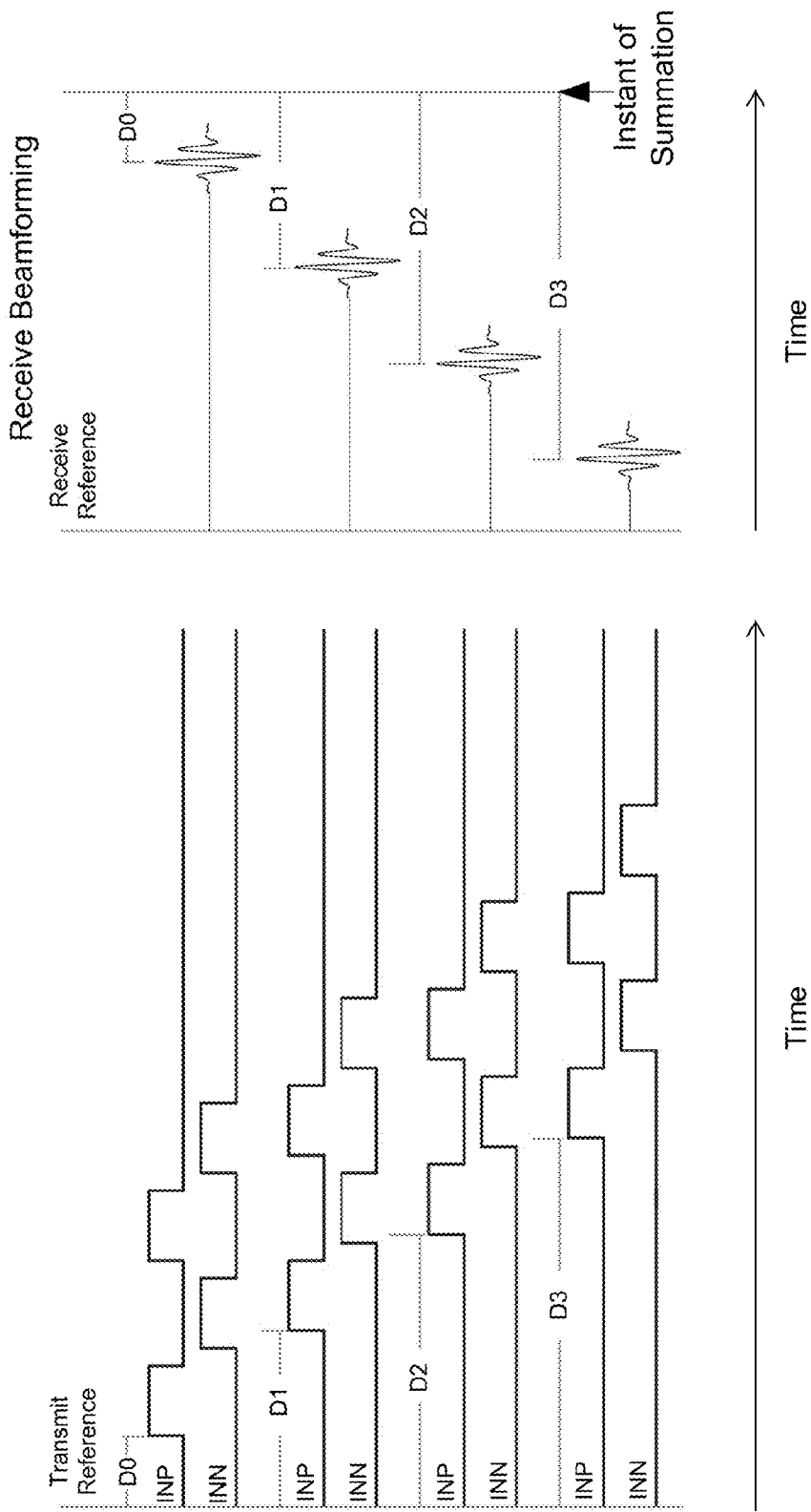
FIG. 8 depicts aspects of time delays used to transmit and receive an acoustic beam with one set of acoustic transducers in the array.

FIG. 8 depicts aspects of time delays used to transmit and receive an acoustic beam using one set of acoustic transducers in the array. INN and INP relate to different transducer elements in a multi-element ultrasonic transducer. "Transmit beamforming" defines a focal point of the transmitted beam and may include for example transmit trigger timing to phase emitted pressure waves from the multi-element ultrasound transducer. "Receive beamforming" defines the focal point of the received echo and may include for example phase alignment and summation of signals that are received at different times by the multi-element ultrasound transducer.

Figure 9:
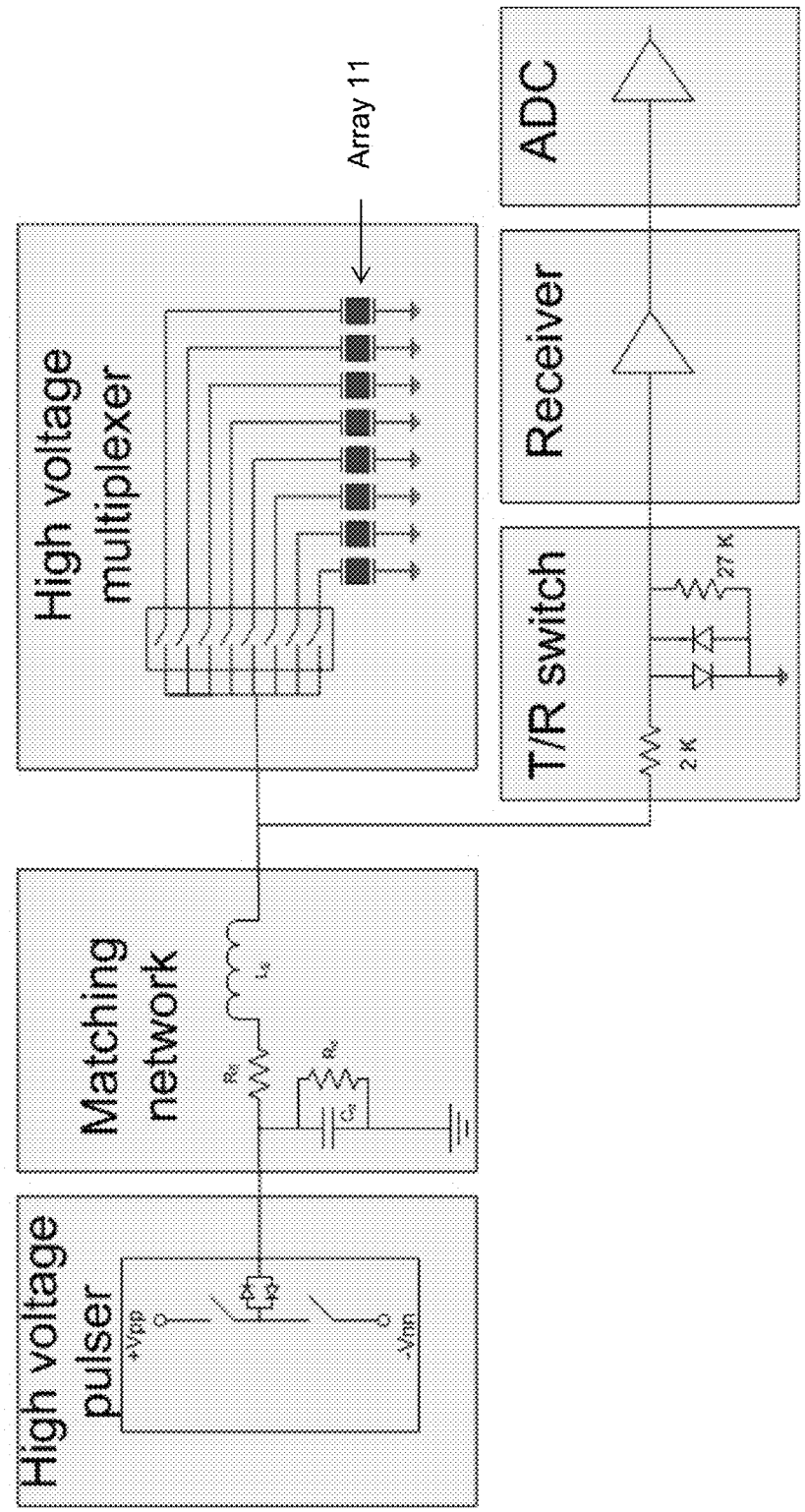
FIG. 9 is a schematic diagram depicting aspects of transmitting and receiving acoustic energy using the array of acoustic transducers.

FIG. 9 is a simplified schematic diagram depicting aspects of one embodiment for transmitting and receiving acoustic energy using the array of acoustic transducers. In FIG. 9, the T/R switch is a switch for transmitting or receiving acoustic energy using the array of acoustic transducers. The receiver includes an amplifier for amplifying the analog signal to the ADC (analog to digital converter) for providing a digital signal having measurement data that may be transmitted uphole such as to the surface.

Figure 10:
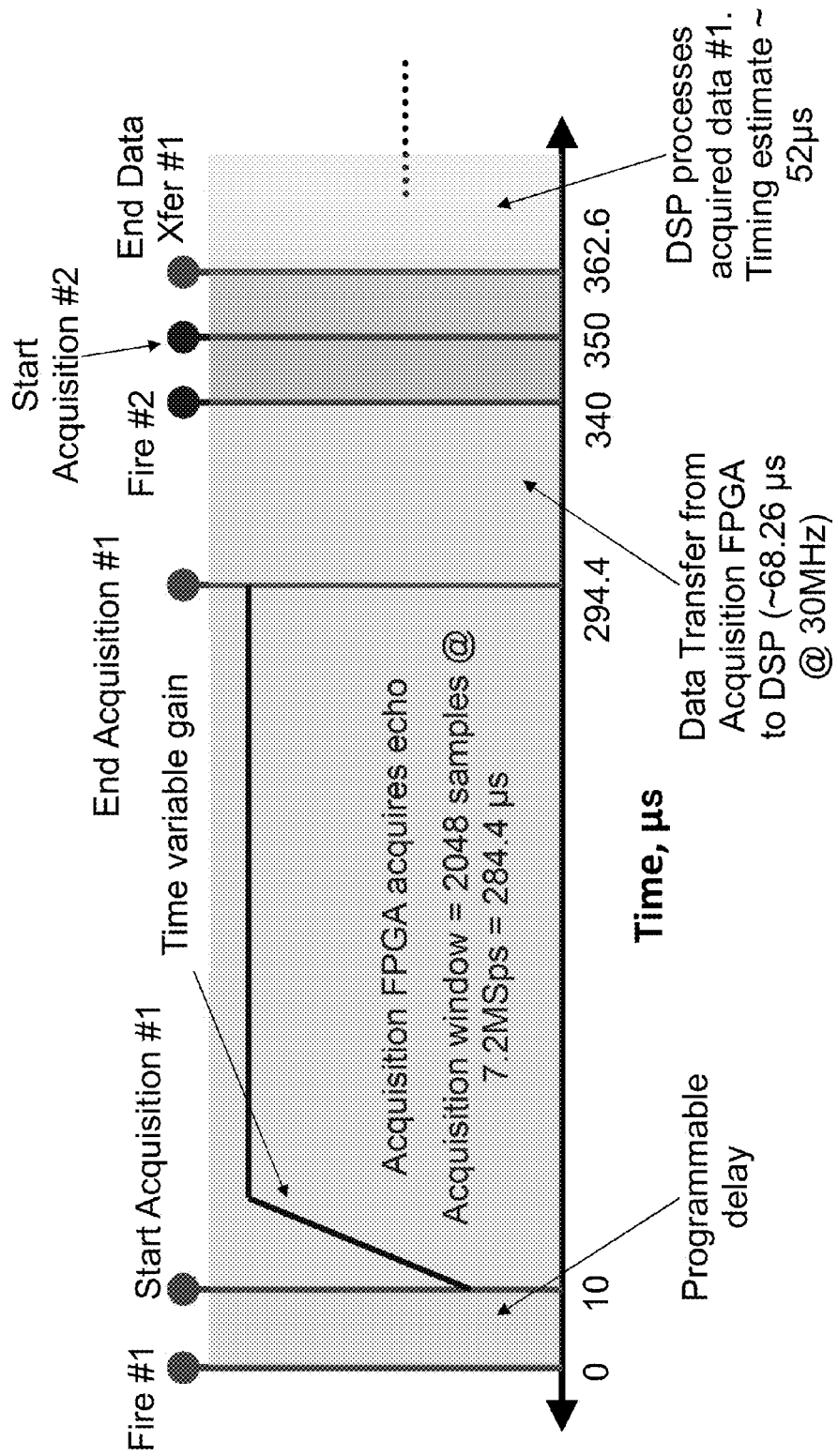
FIG. 10 is a timing diagram depicting aspects of time delays related to transmitting and receiving acoustic signals.

FIG. 10 is one embodiment of a timing diagram depicting aspects of timing related to transmit beamforming and receive beamforming. FPGA is a field programmable gate array and DSP is a digital signal processor. A first transducer (#1) is fired at time=0 and a second transducer (#2) is fired at time=340 μsec. The FPGA acquires echoes during an acquisition window that is 284.4 μs (2048 samples @ 7.2 MSps=284.4 μs). Data transfer from the acquisition FPGA to the DSP is approximately 68.26 μs @ 30 MHz. The DSP processes acquired data #1 from the first transducer in about 52 μs after data transfer from the FPGA.

Figure 11:
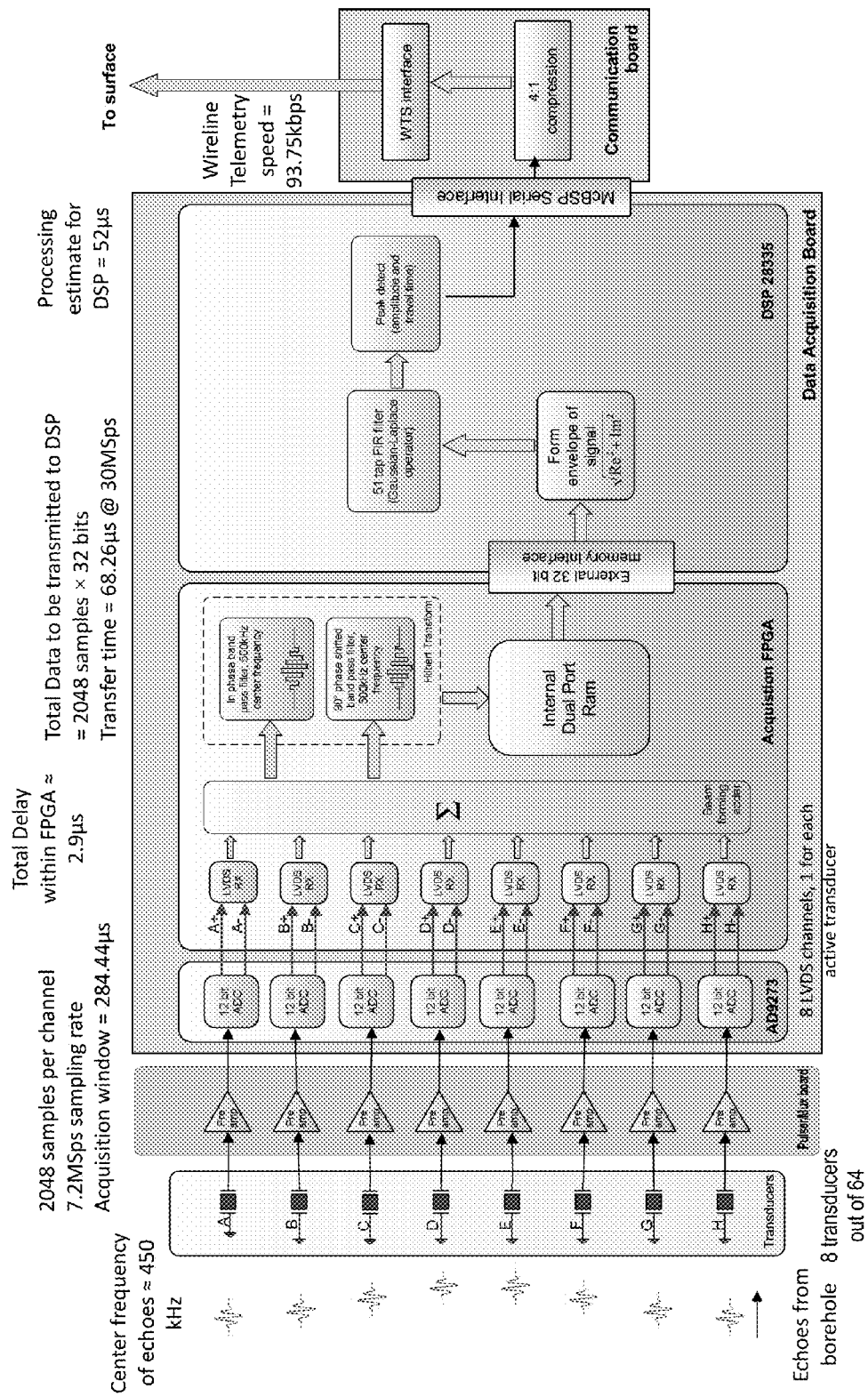
FIG. 11 is a signal flow diagram depicting aspects of receiving acoustic echoes from the borehole wall, processing the received echoes, and transmitting processed data to the surface of the earth.

FIG. 11 is a signal flow diagram depicting aspects of receiving acoustic echoes from the borehole wall, processing the received echoes, and transmitting processed data to the surface of the earth. LVDS relates to low voltage differential signaling. FIR filter is a finite impulse response filter.

Figure 12:
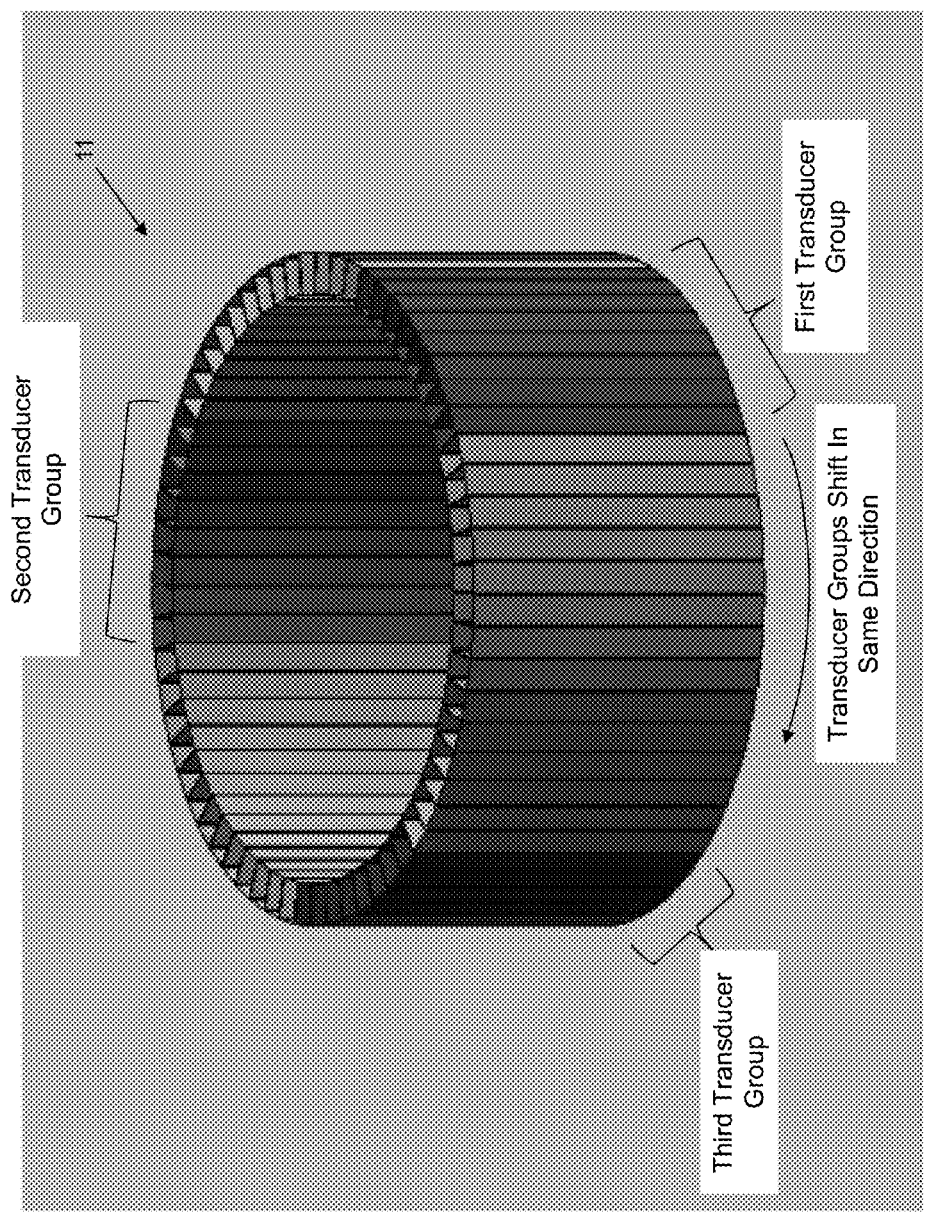
FIG. 12 depicts aspects of beam scanning the borehole wall using three separate acoustic beams formed by three separate sets of acoustic transducers.

FIG. 12 depicts aspects of beam scanning the borehole wall using three separate acoustic beams formed by three separate groups of acoustic transducers where each group acts as a set of transducers as described above. In the embodiment of FIG. 12, three separate acoustic beams simultaneously scan and perform acoustic measurements of the borehole wall. In addition, beam steering can be used to perform more acoustic measurements between the adjacent scanned acoustic beam measurement points to increase resolution before each of the three groups of transducers are shifted in the same direction. Spacing between the transducer sets is selected to minimize interference between the acoustic beams. It can be appreciated that two sets of transducers or more than three sets of transducers may be used to perform simultaneous acoustic measurements as long as the acoustic beams do not significantly interfere with each other.

It can be appreciated that the downhole acoustic tool 10 may be calibrated by analysis or by testing in a laboratory or in the field. The testing may include disposing the tool in a borehole or simulated borehole of known geometry and performing acoustic measurements on one or more formation materials having known properties and with the borehole filled with a borehole fluid having known properties.

Figure 13:
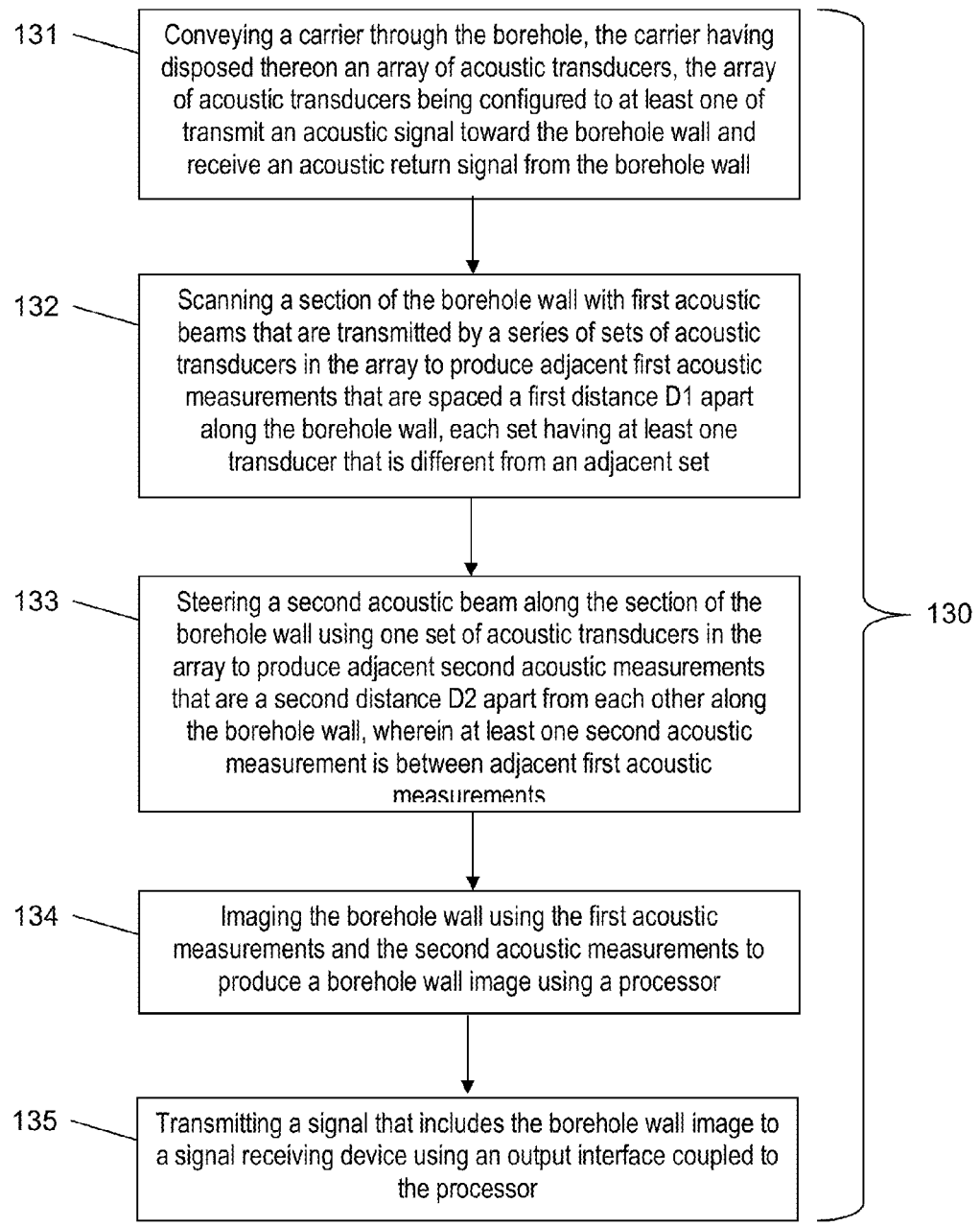
FIG. 13 is a flow chart for a method for imaging a wall of a borehole penetrating the earth.

FIG. 13 is a flow chart for a method 130 for imaging a wall of a borehole penetrating the earth. Block 131 calls for conveying a carrier through the borehole, the carrier having disposed thereon an array of acoustic transducers, the array of acoustic transducers being configured to at least one of transmit an acoustic signal toward the borehole wall and receive an acoustic return signal from the borehole wall. In one or more embodiments, the array may be a circular linear array. Block 132 calls for scanning a section of the borehole wall with first acoustic beams that are transmitted by a series of sets of acoustic transducers in the array to produce adjacent first acoustic measurements that are spaced a first distance D1 apart along the borehole wall, each set having at least one transducer that is different from an adjacent set. Here each set in the series forms an acoustic beam that impinges on the borehole wall at a focal point area. The focal point areas are separated by a distance D1. Block 133 calls for steering a second acoustic beam along the section of the borehole wall using one set of acoustic transducers in the array to produce adjacent second acoustic measurements that are a second distance D2 apart from each other along the borehole wall, wherein at least one second acoustic measurement is between adjacent first acoustic measurements. Steering moves the focal point area using the same set of acoustic transducers. In one or more embodiments, the second distance D2 is less than the first distance D1 in order to further increase resolution. Block 134 calls for imaging the borehole wall using the first acoustic measurements and the second acoustic measurements to produce a borehole wall image using a processor. Block 135 calls for transmitting a signal that includes the borehole wall image to a signal receiving device using an output interface coupled to the processor. The method may include displaying the image on a display, printing the image, or recording the image using a digital or analog format. The image may be created by plotting the values of each measurement versus azimuth to create an image line and then stacking the image lines to image a depth interval. The measurement values may be represented by a shade in grayscale or some other color scale or by a range of colors and shades.

The method 130 may also include correcting for an acoustic side-lobe of a transmitted acoustic beam of interest such as by measuring a reflected signal in the direction of the acoustic side-lobe and subtracting the reflected signal from a measured reflected signal in the direction of the acoustic beam of interest.

The method 130 may also include generating a compound spatial image as the borehole image by averaging measurement values used to generate an image that are obtained from the same focal point from N different steered angles.

The method 130 may also include imaging the borehole wall for 360 degrees by scanning a plurality of sections of the borehole wall with the first acoustic beams and steering the second acoustic beam along the plurality of sections.

The method 130 may also include operating the array by dividing the array into a plurality of groups of transducers and operating the groups simultaneously, wherein the array of acoustic transducers is disposed circumferentially around the carrier. Additionally, the method 130 may include rotationally shifting the groups in a same direction to image the borehole for 360 degrees. The groups may be shifted simultaneously in order to increase logging speed.

The method 130 may also include measuring time-of-flight of the first acoustic beams for the first acoustic measurements and measuring time-of-flight of the second acoustic beam for the second acoustic measurements. Alternatively or in addition, the method 130 may also include measuring amplitude of reflected or return first acoustic beams for the first acoustic measurements and measuring amplitude of reflected or return second acoustic beams for the second acoustic measurements.

The method 130 may also include generating multiple acoustic beams with a circular linear phased of transducers by transmitting and receiving parallel beams from the same aperture and within the same transmit-receive time frame. Alternatively or in addition to generating and receiving beams using the same aperture, multiple simultaneous beams may be transmitted and received using multiple apertures during the same transmit-receive time frame.

The method 130 may also include simplified beam steering by alternating between an odd and even number of transducer elements within a transmit-receive aperture.

The method 130 may also include generating a compound spatial image by averaging the images (i.e., measurement values used to generate the image) obtained from the same focal point from N different steered angles.

The above disclosed apparatus and method provide several advantages. One advantage is that by dividing the transducer array into multiple groups of transducers and operating the groups simultaneously, the borehole or casing lining the borehole can be characterized quickly thereby minimizing the costs associated with the characterizing and lost opportunities. To achieve faster logging speeds, one or more active array apertures can be activated simultaneously, each with two or more parallel transmit and/or receive beam patterns. For example, a single transmit aperture can be divided into three receive apertures to receive from three different scan positions. Each receive aperture may be formed with a receive channel having the time delays adjusted to focus on three desired scan positions, therefore three scan positions can be acquired within the time of a single transmit/receive frame. Each element in the transmit aperture can be excited at the same time to create a single naturally focused beam field, with all of the focusing done on receive, or each element of the transmit aperture can be excited with a pulse train to create a focused transmit beam at each of the desired scan positions.

Another advantage is that the resolution and therefore accuracy of borehole characterization can be increased due to the combination of acoustic beam scanning and acoustic beam steering.

Yet another advantage is that the influence of side-lobes on transmitted acoustic beams can be reduced or eliminated such as by subtracting a measured reflected signal in the direction of a side-lobe from a measured reflected signal in the direction of a main beam or beam of interest.

In support of the teachings herein, various analysis components may be used, including a digital and/or an analog system. For example, the downhole electronics 8 or the computer processing system 9 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. Processed data such as a result of an implemented method may be transmitted as a signal via a processor output interface to a signal receiving device. The signal receiving device may be a display monitor or printer for presenting the result to a user. Alternatively or in addition, the signal receiving device may be memory or a storage medium. It can be appreciated that storing the result in memory or the storage medium will transform the memory or storage medium into a new state (containing the result) from a prior state (not containing the result). Further, an alert signal may be transmitted from the processor to a user interface if the result exceeds a threshold value.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or any combination of terms. The term "configured" relates one or more structural limitations of a device that are required for the device to perform the function or operation for which the device is configured. The term "coupled" relates to a first component being coupled either directly to a second component or indirectly through an intermediate component. The terms "first" and "second" do not denote a particular order, but are used to distinguish different elements.

The flow diagrams depicted herein are just examples. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for imaging a wall of a borehole penetrating the earth, the apparatus comprising:
    a carrier configured to be conveyed through the borehole;
    an array of acoustic transducers disposed on the carrier and configured to at least one of transmit an acoustic signal toward the borehole wall and receive an acoustic return signal from the borehole wall, wherein the array of acoustic transducers is disposed 360 degrees circumferentially around the carrier;
    a controller configured to (i) scan a section of the borehole wall with first acoustic beams that are transmitted by a series of sets of acoustic transducers in the array to produce adjacent first acoustic measurements that are spaced a first distance D1 apart along the borehole wall, each set having at least one transducer that is different from an adjacent set, (ii) steer a second acoustic beam along the section of the borehole wall using one set of acoustic transducers in the array to produce adjacent second acoustic measurements that are a second distance D2 apart along the borehole wall, and (iii) image the borehole wall using the first acoustic measurements and the second acoustic measurement to generate a borehole wall image, wherein the second acoustic measurements form an image of points of the borehole wall located between points of the borehole wall imaged by the first acoustic measurements; and
    an output interface coupled to the processor and configured to transmit a signal comprising the borehole wall image to a signal receiving device.

2. The apparatus according to claim 1, wherein the controller is further configured to correct for an acoustic side-lobe of a transmitted acoustic beam of interest.

3. The apparatus according to claim 2, wherein the controller is further configured to measure a reflected signal in the direction of the acoustic side-lobe and to subtract the reflected signal from a measured reflected signal in the direction of the acoustic beam of interest.

4. The apparatus according to claim 1, wherein the controller is configured to generate a compound spatial image by averaging measurement values used to generate an image that are obtained from the same focal point from N different steered angles.

5. The apparatus according to claim 1, wherein the controller is further configured to image the borehole wall for 360 degrees by scanning a plurality of sections of the borehole wall with the first acoustic beams and steering the second acoustic beam along the plurality of sections.

6. The apparatus according to claim 1, wherein the controller is further configured to operate the array by dividing the array into a plurality of groups of transducers and operating the groups simultaneously.

7. The apparatus according to claim 6, wherein the controller is further configured to rotationally shift the groups simultaneously in a same direction to image the borehole for 360 degrees.

8. The apparatus according to claim 1, wherein the first acoustic measurements comprise time-of-flight measurements of the first acoustic beams and the second acoustic measurements comprise time-of-flight measurements of the second acoustic beam.

9. The apparatus according to claim 1, wherein the first acoustic measurements comprise amplitude measurements of the first acoustic beams and the second acoustic measurements comprise amplitude measurements of the second acoustic beam.

10. The apparatus according to claim 1, wherein the array comprises multiple arrays and the controller is further configured to operate the multiple arrays simultaneously.

11. The apparatus according to claim 1, wherein the second distance D2 is less than the first distance D1.

12. The apparatus according to claim 1, wherein a focal point of the second acoustic measurements overlaps a focal point of the first acoustic measurements.

13. A method for imaging a wall of a borehole penetrating the earth, the method comprising:
conveying a carrier through the borehole, the carrier having disposed thereon an array of acoustic transducers, the array of acoustic transducers being configured to at least one of transmit an acoustic signal toward the borehole wall and receive an acoustic return signal from the borehole wall, wherein the array of acoustic transducers is disposed 360 degrees circumferentially around the carrier;
scanning a section of the borehole wall with first acoustic beams that are transmitted by a series of sets of acoustic transducers in the array to produce adjacent first acoustic measurements that are spaced a first distance D1 apart along the borehole wall, each set having at least one transducer that is different from an adjacent set;
steering a second acoustic beam along the section of the borehole wall using one set of acoustic transducers in the array to produce adjacent second acoustic measurements that are a second distance D2 apart from each other along the borehole wall, wherein the second acoustic measurements form an image of points of the borehole wall located between points of the borehole wall imaged by the first acoustic measurements;
imaging the borehole wall using the first acoustic measurements and the second acoustic measurements to produce a borehole wall image using a processor; and
transmitting a signal comprising the borehole wall image to a signal receiving device using an output interface coupled to the processor.

14. The method according to claim 13, further comprising correcting for an acoustic side-lobe of a transmitted acoustic beam of interest.

15. The method according to claim 14, further comprising measuring a reflected signal in the direction of the acoustic side-lobe and subtracting the reflected signal from a measured reflected signal in the direction of the acoustic beam of interest.

16. The method according to claim 13, wherein the borehole image is a compound spatial image and the method further comprises averaging measurement values used to generate an image that are obtained from the same focal point from N different steered angles.

17. The method according to claim 13, further comprising imaging the borehole wall for 360 degrees by scanning a plurality of sections of the borehole wall with the first acoustic beams and steering the second acoustic beam along the plurality of sections.

18. The method according to claim 13, further comprising operating the array by dividing the array into a plurality of groups of transducers and operating the groups simultaneously, wherein the array of acoustic transducers is disposed circumferentially around the carrier.

19. The method according to claim 18, further comprising rotationally shifting the groups simultaneously in a same direction to image the borehole for 360 degrees.

20. The method according to claim 18, further comprising measuring time-of-flight of the first acoustic beams for the first acoustic measurements and measuring time-of-flight of the second acoustic beam for the second acoustic measurements.

21. The method according to claim 18, further comprising measuring amplitude of reflected first acoustic beams for the first acoustic measurements and measuring amplitude of reflected second acoustic beams for the second acoustic measurements.

* * * * *